Figure 1:
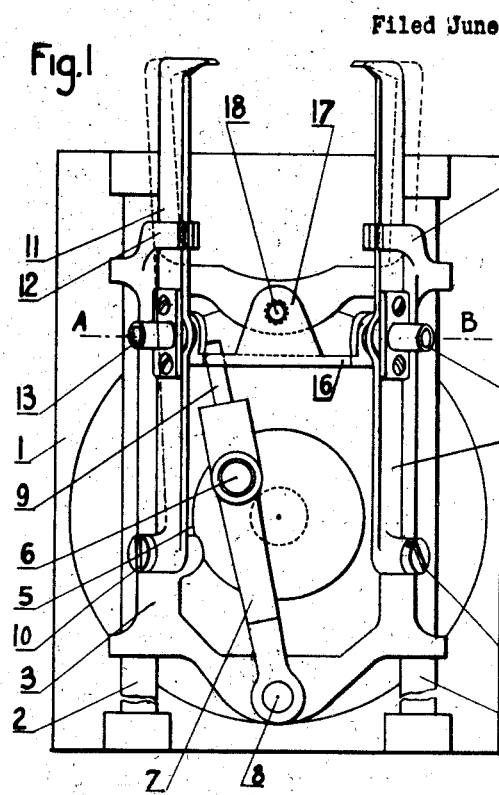

Feb. 26, 1924.

A. L. V. C. DEBRIE 1,484,701

FILM ACTUATING DEVICE FOR POSITIVE FILM PRINTING MACHINES

Filed June 16, 1922

Inventor:
A.L.V.C. Debrie
By
Languer, Parry, Card, + Langard
Attys

Patented Feb. 26, 1924.

1,484,701

UNITED STATES PATENT OFFICE.

ANDRE LEON VICTOR CLEMENT DEBRIE, OF PARIS, FRANCE.

FILM-ACTUATING DEVICE FOR POSITIVE-FILM-PRINTING MACHINES.

Application filed June 16, 1922. Serial No. 568,828.

*To all whom it may concern:*

Be it known that I, ANDRE LEON VICTOR CLEMENT DEBRIE, citizen of the French Republic, residing 111 Rue Saint-Maur, Paris, France, have invented certain new and useful Improvements in Film-Actuating Devices for Positive-Film-Printing Machines, of which the following is a specification.

It is well known that the positive film printing machines are essentially constituted by a box containing an illuminant and having an aperture in one side before which the negative film is caused to travel together with the film which is to be printed in order to form the positive images, the gelatine sides of said films being placed together and held in close contact when opposite the said aperture. The films are drawn along by means of suitable claws which enter the perforations at each side of the two films, the claws being then caused to descend together with the pair of films.

In the known devices, in order to facilitate the construction, the claws are made to seize the films at some distance below the printing aperture. But this method has a disadvantage by reason of the fact that the positive and negative films cannot be said to contain exactly spaced perforations, so that when the claws attain the bottom of the stroke and are released from both films, they will leave the two sets of perforations, positive and negative, in an exactly superposed state, but the perforations situated at the point where the printing operation takes place will no longer be in coincidence. For this reason the image printed upon the positive film will have a difference of spacing with regard to these perforations, by an amount corresponding to the pitch of the positive and negative perforations multiplied by the number of perforations situated between the said printing aperture and the lower dead point of the stroke of the claws, and this condition will cause difficulties in centering the image during the projection.

When the claws enter the perforations, they will cause the two films to slide upon each other before drawing them along together, until the perforations of the positive and negative films shall have come into coincidence at the bottom of the stroke of the claws as above indicated.

According to my invention, the claws are made to seize the film opposite the image to be printed. It has been found difficult to engage the claws with the film perforations next the image inasmuch as the light proceeds from the apparatus through a flaring tube whose large base situated within the box has a diameter which is larger than the width of the films comprised between the two rows of perforations. In the said invention, instead of causing the claws to engage the perforations in the direction perpendicular to the films, I have therefore made use of an oblique engagement, this being substantially parallel to the horizontal generatrices of the cone of light; the claws are then moved in the vertical sense to propel the films.

Figure 2:
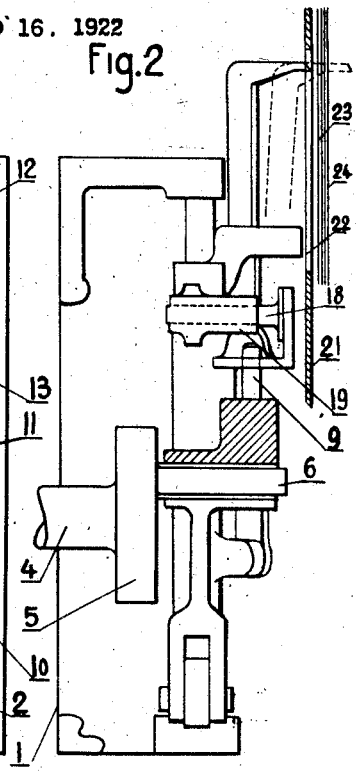
Figure 3:
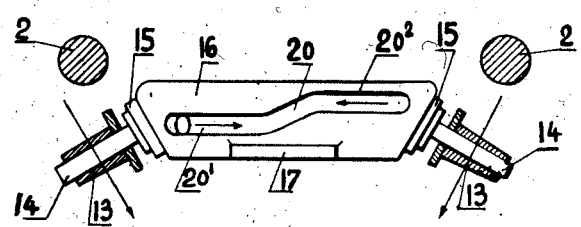
Figure 4:
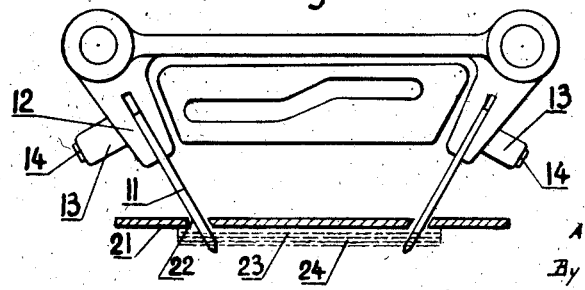

A form of construction of this invention is shown by way of example in the accompanying drawings, wherein:

Fig. 1 is a front view of the device,
Fig. 2 is a side view with parts in section.
Fig. 3 is a section on the line A—B Fig. 1.
Fig. 4 is a plan view of the upper part.

To the side 1 of the box which is provided with an aperture for the passage of the light are secured two vertical rods 2 having slidable thereon the frame 3. The driving shaft 4 ends in a disk 5 having mounted thereon an eccentric crank pin 6. Upon the latter is articulated an arm 7 pivoting on the axle 8 which is mounted on the lower cross-piece of the frame 3; said arm ends in a stud 9. The two claws 11 are pivoted upon two corresponding axles 10 respectively secured to the lower part of the uprights of the frame 3 in an oblique position with respect to the cross-pieces, said claws being guided by the straps 12 disposed at the upper part of the uprights. Each of said claws has mounted thereupon a sleeve 13 wherein is slidable an axle 14 secured to the lug 15 of a plate 16 which is disposed horizontally between the uprights of the frame and is provided with a third lug 17 carrying an axle 18 which is slidable in a sleeve 19 provided upon the upper cross-piece of the frame 3. The plate 16 has formed therein a slot 20 having two portions $20^1$, $20^2$ parallel to each other and and also to the frame and connected together by an oblique portion, Fig. 3. The stud 9 of the arm 7 cooperates with said groove and is slidable therein.

A plate 21 is disposed forwardly of the claws 11 and is provided with two slots 22 formed obliquely therein and cooperating with the respective ends of the claws. The two films, negative 23 and positive 24, travel at the same time before the plate 21.

The said device operates in the following manner:

Upon the rotation of the shaft 4, the crank pin 6 gives rise to two separate movements, firstly, by means of the arm 7, it causes the frame 3 to rise and descend upon the rods 2 together with the members secured thereto, especially the claws 11; secondly the stud 9 has a reciprocating motion through the slot 20, and by reason of the offset positions of the parts of the slot $20^1$, $20^2$, it will cause the plate 16 to approach and recede from the side 1 of the apparatus. In this latter movement, the axle or shaft 18 will slide in the sleeve 19; the axles or shafts 14 will slide in the sleeves 13 and will actuate the claws 11 which pivot on the axles 10.

The device is so adjusted that when the claws are about to seize the films, the frame 3 will be at the top of its stroke. At this time the stud 9 moves from left to right and occupies the portion $20^2$ of the slot, thereby separating the plate 16 from the wall 1. At the same time, the axles 14 will actuate the claws 11 by pivoting the latter on the axles 10. The upper part of said claws will then extend outwardly of the slot 22 of the plate 21—as shown in Fig. 4 and in dotted lines in Fig. 2, and will enter the perforations of the films 23 and 24.

The crank pin 6 then moves downwardly and causes the vertical descent of the frame 3 and the claws 11 which draw along the two films; the crank pin then moves from right to left and the stud 9 proceeds from the portion $20^2$ to $20^1$ of the groove: the plate 16 moves backward, drawing with it the claws which are separated from the films and take a position in the rear of the plate 21, as shown in the dotted lines Fig. 2. The shutter now opens for the printing of one of the images upon the positive film, and the crank pin 6 then rises and effects the vertical movement of the frame 3 and claws 11, and the same are now in position to recommence the series of movements as set forth.

In practice, the crank pin 6 will not effect two horizontal and two vertical movements, but a circular movement which produces the rise and descent of the frame 3 as well as the forward and backward motion of the claws 11 through the intermediary of the plate 16. In order to provide for the engagement and release of the claws while maintaining the constant spacing of the same for all heights, the axles 14 are slidable in the sleeves 13.

By said device, the claws while in the oblique position with respect to the films, will be enabled to enter the films quite as well as the claws which are used in the perpendicular position in the known devices.

The member provided with the slot is connected with the claws by horizontal axles slidable in sleeves carried by the claws.

What I claim is:

1. A film actuating device comprising vertically reciprocable claws, horizontal axles, disposed obliquely with respect to the surface of the films, and also vertically reciprocable, said claws being pivoted on said axles, said claws being positioned to seize the films immediately adjacent the image.

2. A film actuating device comprising two vertical rods, a frame slidable on said rods and carrying two horizontal axles, said axles being obliquely disposed relative to the films, claws pivoted at their lower portions, to said axles, said claws being positioned to seize the films adjacent the image.

3. Film actuating device comprising a horizontal driving shaft, a revoluble disk at the end of said driving shaft, an eccentric pin carried by said disk an arm articulated to said eccentric pin, a vertically slidable frame an axle mounted on said frame upon which is pivoted said arm, two horizontal axles carried by the uprights of the frame and disposed obliquely to the crosspieces of said frame, claws articulated at their lower part upon said horizontal axles; a stud at the end of above said arm, a member adapted for forward and back motion with respect to the film, a suitably shaped slot formed in said member and cooperating with above said stud, and means for connecting the upper part of the claws with said member.

4. Film actuating device comprising a horizontal driving shaft, a revoluble disk at the end of said driving shaft, an eccentric pin carried by said disk, an arm articulated to said eccentric pin, a vertically slidable frame, an axle mounted on said frame, upon which is pivoted said arm, two horizontal axles carried by the uprights of the frame and disposed obliquely to the cross-pieces of said frame, claws articulated at their lower part upon said horizontal axles, a stud at the end of above said arm, a member adapted for forward and back motion with respect to the film, a suitably shaped slot formed in said member and cooperating with above said stud, horizontal axles mounted on said member, said axles being obliquely disposed with respect to the cross pieces of the frame, and sleeves carried by the claws and in slidable engagement with said horizontal axles.

In witness whereof I have hereunto set my hand.

ANDRE LEON VICTOR CLEMENT DEBRIE.